US009713066B2

(12) United States Patent
Thondapu et al.

(10) Patent No.: US 9,713,066 B2
(45) Date of Patent: Jul. 18, 2017

(54) MOBILE ACCESS POINT CONNECTION SWITCHING

(71) Applicant: QUALCOMM Incorporated, San Diego, CA (US)

(72) Inventors: Ramu Thondapu, Hyderabad (IN); Prasad Venkata Vara Gadde, Hyderabad (IN); Sri Sai Kandakatla, Hyderabad (IN); Chaitanya Pratapa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/054,964

(22) Filed: Feb. 26, 2016

(65) Prior Publication Data
US 2016/0262087 A1    Sep. 8, 2016

Related U.S. Application Data

(60) Provisional application No. 62/127,167, filed on Mar. 2, 2015.

(51) Int. Cl.
| | |
|---|---|
| *H04M 3/00* | (2006.01) |
| *H04W 48/06* | (2009.01) |
| *H04W 48/18* | (2009.01) |
| *H04W 76/02* | (2009.01) |
| *H04L 12/28* | (2006.01) |
| *H04W 88/10* | (2009.01) |
| *H04W 92/04* | (2009.01) |
| *H04W 84/00* | (2009.01) |

(52) U.S. Cl.
CPC ......... *H04W 48/06* (2013.01); *H04L 12/2856* (2013.01); *H04W 48/18* (2013.01); *H04W 76/02* (2013.01); *H04W 76/026* (2013.01); *H04W 84/005* (2013.01); *H04W 88/10* (2013.01); *H04W 92/045* (2013.01)

(58) Field of Classification Search
CPC ..... H04W 88/06; H04W 8/245; H04W 48/16; H04M 1/72519; H04L 29/06027
USPC ............ 455/418, 550.1, 552.1, 434; 370/352
See application file for complete search history.

(56) References Cited

U.S. PATENT DOCUMENTS

| 8,160,062 B2 | 4/2012 | Qian et al. |
| 8,446,830 B2 | 5/2013 | Wu et al. |

(Continued)

OTHER PUBLICATIONS

International Search Report and Written Opinion—PCT/US2016/020032—ISA/EPO—Jun. 24, 2016.

*Primary Examiner* — Danh Le
(74) *Attorney, Agent, or Firm* — Knobbe, Martens, Olson & Bear, LLP

(57) ABSTRACT

In one aspect, mobile access point devices may provide client devices access to an internet service provider. The mobile access point may communicate with the internet service provider via a cellular connection or a Wi-Fi connection. As the Wi-Fi connection may cause data service access failures due to, for example, firewalls, protocol limitations, or application layer gateways, allowing the mobile access point device to dynamically determine which mode of communication will reach the internet service provider can ensure more efficient service provisioning to the client devices. Packet filters may be maintained at the mobile access point device which identify which connections should be established via cellular and which should be established via Wi-Fi.

29 Claims, 5 Drawing Sheets

(56) References Cited

U.S. PATENT DOCUMENTS

| | | | |
|---|---|---|---|
| 9,015,019 B1* | 4/2015 | Kim | H04W 16/22 703/13 |
| 2006/0195896 A1* | 8/2006 | Fulp | H04L 63/0263 726/11 |
| 2007/0242602 A1* | 10/2007 | Pang | H04L 12/462 370/216 |
| 2009/0124284 A1 | 5/2009 | Scherzer et al. | |
| 2011/0267948 A1 | 11/2011 | Koc et al. | |
| 2012/0290686 A1* | 11/2012 | Anchan | H04L 61/2514 709/218 |
| 2013/0144785 A1* | 6/2013 | Karpenko | G06Q 20/409 705/44 |
| 2013/0155876 A1 | 6/2013 | Potra et al. | |
| 2013/0159081 A1* | 6/2013 | Shastry | G06Q 30/0274 705/14.23 |
| 2013/0226609 A1* | 8/2013 | Pourfallah | G06Q 20/347 705/2 |
| 2014/0071854 A1 | 3/2014 | Xiang et al. | |
| 2016/0105449 A1* | 4/2016 | Montagnon | H04L 67/2814 726/22 |

\* cited by examiner

MOBILE ACCESS POINT CONNECTION SWITCHING

CROSS-REFERENCE TO RELATED APPLICATIONS

The present application claims the benefit of U.S. Provisional Patent Application Ser. No. 62/127,167, filed Mar. 2, 2015 and entitled "MOBILE ACCESS POINT CONNECTION SWITCHING" the disclosure of which is incorporated by reference in its entirety. Furthermore, any and all priority claims identified in the Application Data Sheet, or any correction thereto, are hereby incorporated by reference under 37 C.F.R. §1.57.

BACKGROUND

Field

The present application relates generally to wireless communications, and more specifically to efficient connection switching for mobile access points.

Background

Wireless communication systems are widely deployed to provide various types of communication content such as voice, video, and/or data. A mobile access point is one type of device which provides network services to one or more client devices. The network services provided by the mobile access point may be determined based on the network to which the mobile access point is connected. For example, a mobile access point may be configured to connect, as a client, to multiple networks such as a cellular network, fiber optic network, Ethernet, Wi-Fi network, or the like. The mobile access point may then provide Wi-Fi access to client devices. Some mobile access point implementations rely on signal strength to determine which network to connect to as a client. This can be resource intensive for the mobile access point as well as for the clients receiving service through the mobile access point.

SUMMARY

In one innovative aspect, a device for network connection switching is provided. The device includes an access point network interface configured to communicate messages to and from a client device. The device includes a first client network interface configured to communicate messages to and from a wide-area network via a first access point via a first radio access technology. The device further includes a second client network interface configured to communicate messages to and from the wide-area network via a second access point via a second radio access technology. The device also includes a traffic router configured to direct a message received from a client device for a service located on the wide-area network to one of the first client network interface or the second client network interface. The device includes a blockage detector. The blockage detector is configured to receive connection state information generated while establishing a connection for communicating the message to the service. The blockage detector is further configured to identify blocking of the connection at the first access point or the second access point receiving the message using the connection state information for the connection used for the message. The blockage detector also adjusts the traffic router to direct a subsequent message from the client device to the other of the first client network interface or the second client network interface.

In another innovative aspect, a method of network connection switching is provided. The method includes receiving, at a mobile access point, a request from a client device to establish a communication session with a wide-area network service. The method includes creating a connection tracking table entry to establish a connection for the communication session via a first access point, the connection tracking table entry includes connection state information for the connection. The method includes receiving the connection state information from the connection tracking table entry for the connection, the connection state information for the connection indicating the connection tracking table entry has expired while in an initialization state. The method includes identifying blocking of the connection by the first access point using the connection state information. The method further includes establishing an alternate connection for the communication session via a second access point.

In a further innovative aspect, a non-transitory computer-readable medium comprising code is provided. The code, when executed, causes an apparatus to receive a request from a client device to establish a communication session with a wide-area network service. The code, when executed, further causes the apparatus to create a connection tracking table entry to establish a connection for the communication session via a first access point, the connection tracking table entry includes connection state information for the connection. The code, when executed, further causes the apparatus to receive the connection state information from the connection tracking table entry for the connection, the connection state information for the connection indicating the connection tracking table entry has expired while in an initialization state. The code, when executed, further causes the apparatus to identify blocking of the connection by the first access point using the connection state information. The code, when executed, further causes the apparatus to establish an alternate connection for the communication session via a second access point.

Another innovative device for network connection switching is provided. The device includes means for receiving a request from a client device to establish a communication session with a wide-area network service. The device includes means for creating a connection tracking table entry to establish a connection for the communication session via a first access point, the connection tracking table entry includes connection state information for the connection. The device includes means for receiving the connection state information from the connection tracking table entry for the connection, the connection state information for the connection indicating the connection tracking table entry has expired while in an initialization state. The device includes means for identifying blocking of the connection by the first access point. The device includes means for establishing an alternate connection for the communication session via a second access point.

Various implementations of methods and apparatus within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

Figure 1:
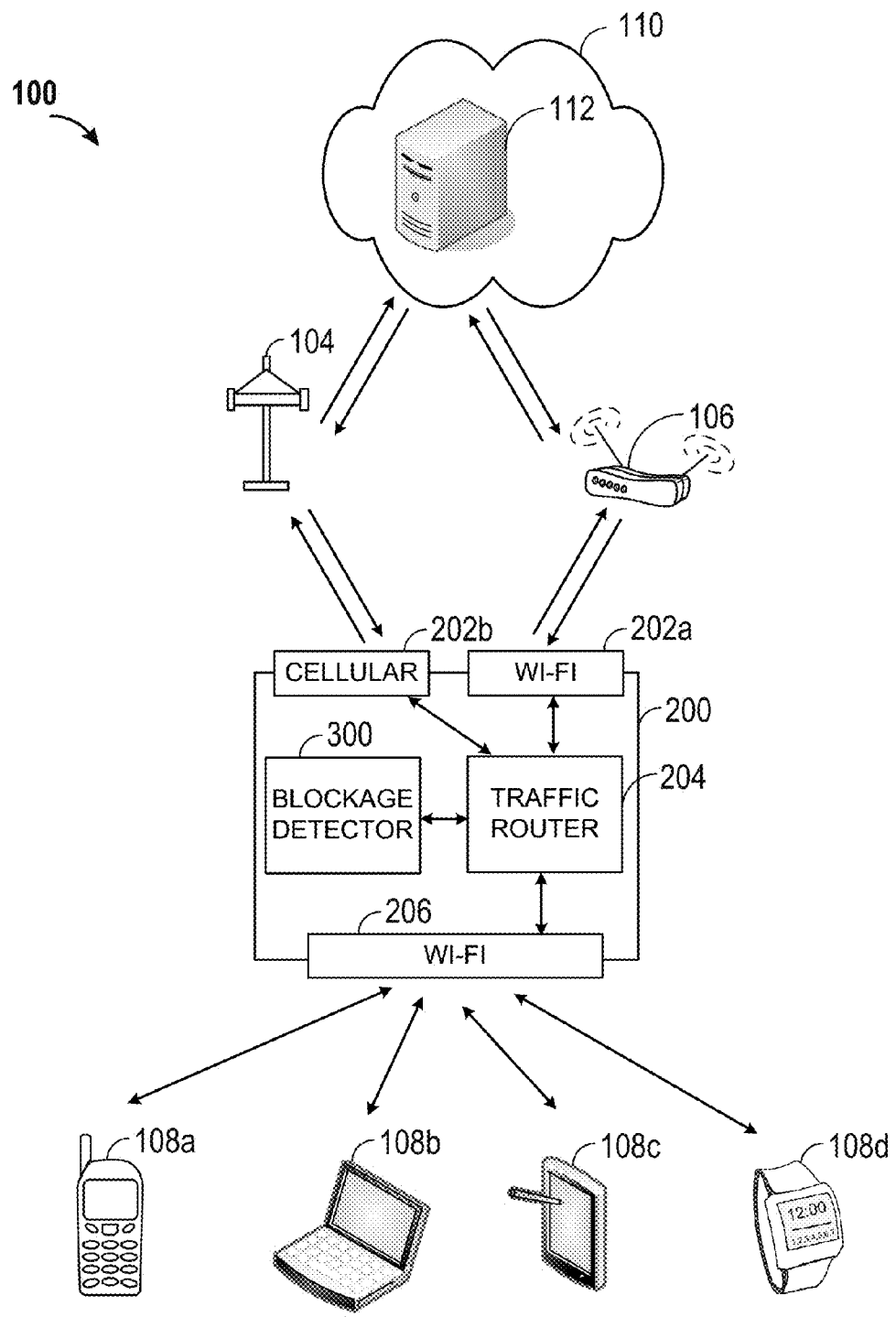
FIG. 1 illustrates a network diagram of an example of a wireless communication network in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Client devices accessing a network can encounter browsing issues when accessing the network via a mobile access point. For example, the mobile access point may be configured to map its default communication interface to a third party Wi-Fi access point, such as provided in a hotel, office, or coffee shop. In this scenario, clients of the mobile access point will communicate with Internet service provider servers via the third party access point rather than another network connection of the mobile access point such as a cellular connection. The data path for traffic from the client will flow via Wi-Fi from the client to the mobile access point and then via Wi-Fi from the mobile access point to the third party access point who will then route the communication to the Internet service provider server.

Connected clients can experience data services access failures caused by the third party Wi-Fi access point. For example, the third party Wi-Fi access point may block websites due to firewalls. The third party Wi-Fi access point may not support or may block Virtual Private Networks or other service types. The third party Wi-Fi access point may not support requested application layer gateways like SIP (or other voice over MIFI feature), TFTP, RTSP, video streaming, etc. These failures may cause connected Wi-Fi clients to have poor user experience due to, for example, failed domain name system (DNS) query for the service, stalled or terminated browsing session, etc. Furthermore, the client and the mobile access point may spend valuable resources such as power, processor time, airtime, bandwidth, and memory, to attempt connections to servers or services which are not permitted by the third party Wi-Fi access point.

In a system where a network having the highest signal strength is selected for network communications when multiple networks are available, a mobile access point may default to the network with the highest signal strength even when a communication path is blocked, e.g., by a third party Wi-Fi access point. For example, a mobile access points may default to the Wi-Fi network when both Wi-Fi and cellular networks are available because the Wi-Fi network has higher signal strength than the cellular network. In this scenario, the data path may not switch to cellular even if the Wi-Fi path is blocked by a third-party Wi-Fi AP.

The features described in further detail below can be applied to reduce the resources expended by the mobile access point and client devices to provide efficient identification of blockages and switching from a first network which may prohibit communications to a second network which may allow the communications. For example, mobile access point devices may provide client devices access to an internet service provider. The mobile access point may communicate with the internet service provider via a cellular connection or a Wi-Fi connection. As the Wi-Fi connection may cause data service access failures due to, for example, firewalls, protocol limitations, or application layer gateways, allowing the mobile access point device to dynamically determine which mode of communication will reach the internet service provider can ensure more efficient service provisioning to the client devices. Packet filters may be maintained at the mobile access point device which identify which connections should be established via cellular and which should be established via Wi-Fi.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Institute of Electrical and Electronics Engineers (IEEE) 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

It should be emphasized that the disclosed techniques may also be applicable to technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a wireless communication system 100 in which aspects of the present disclosure may be employed. The wireless communication system 100 may include a cellular access point (AP) 104 and a Wi-Fi AP 106. The AP 104 may provide direct access to a wireless cellular network such as a fourth generation (4G) long term evolution (LTE) wireless network, for 4G LTE-capable wireless devices within a basic service area for the cellular AP 104. The Wi-Fi AP 106 may provide direct access to an IP network. Via either the wireless cellular network or the IP network, access to a wide-area network 110 such as the Internet may be provided. A service provider server 112 may be connected to the wide-area network 110 and provide a service to at least one of a plurality of client devices 108a, 108b, 108c, and 108d, hereinafter collectively client devices, STAs, UEs, or service client devices 108a-108d. Examples of the services provided include voice-telephony, video conferencing, instant messaging, streaming media (e.g., audio, video, text, or combinations thereof), monitoring, document processing, and the like.

Some client devices 108a-108d may access the cellular AP 104 or Wi-Fi AP 106 directly. In some implementations, the client devices 108a-108d may access the wide-area network 110 via a software access point (SoftAP) 200. The SoftAP 200 may also be referred to as a wireless relay device or modem and may comprise a wireless device or apparatus having 4G LTE capability and also having a wireless relay or hotspot capability such that one or more wireless devices not having or not currently utilizing 4G LTE capability, for example the client devices 108a-108d, may utilize the SoftAP 200 as a wireless relay device or hotspot for providing a connection between the client devices 108a-108d and the wide-area network via the 4G LTE network at cellular AP 104 and the Wi-Fi AP 106. It will be appreciated that the SoftAP 200 may be configured to provide services to client devices via additional or alternative access points. For example, the SoftAP 200 may include a wired network, such as an Ethernet.

To facilitate communication with APs, the SoftAP 200 includes network interfaces to the APs. In some implementations, these may be referred to as client interfaces because they allow the SoftAP 200 to communicate as a client device with the AP providing access to the wide-area network 110. As shown in FIG. 1, the SoftAP 200 includes a cellular client interface 202b and a Wi-Fi client interface 202a, hereinafter collectively referred to as client interface 202 or client interfaces 202. Although the discussion uses cellular and Wi-Fi as two example client interfaces, other communication network technologies may be provided via additional client interfaces such as an Ethernet interface, IEEE 802.15.1 (e.g., Bluetooth™) interface, or the like. The interfaces may be implemented as network cards providing access via the protocol for the associated AP. In some implementations, the interfaces may be implemented using common components such as a wired and/or wireless signal card which is specially configured to distinguish various radio access technologies.

The SoftAP 200 shown in FIG. 1 also includes a serving Wi-Fi network interface 206. The serving Wi-Fi network interface 206 provides network access to the client devices 108a-108d. Accordingly, the SoftAP 200 may appear to the client devices 108a-108d as a Wi-Fi access point.

The SoftAP 200 may include a traffic router 204. For uplink traffic (e.g., traffic transmitted from a client device to the wide-area network 110), the traffic router 204 receives packet data at the serving Wi-Fi network interface 206 and provides the data to the traffic router 204. The traffic router 204 then determines which AP network interface to utilize for the data. The SoftAP 200 may include a blockage detector 300 which is configured to determine whether an AP is blocking transmissions as discussed in further detail below. If the blockage detector 300 determines that, for example, the Wi-Fi AP 106 is blocking video telephony traffic, the traffic router 204 may dynamically adjust the route for video telephony service data to flow via the cellular network interface 202b rather than via the Wi-Fi network interface 202a.

For the purposes of this application, an access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

For the purposes of this application, a station (STA) may comprise, be implemented as, or known as an access terminal (AT), a subscriber station, a subscriber unit, a mobile station, a remote station, a remote terminal, a user terminal, a user agent, a user device, user equipment (UE), an internet messaging service (IMS) client, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the APs 104 and 106 and the SoftAP 200 as well as between the client devices 108a-108d and the SoftAP 200. A communication link that facilitates transmission from the AP 104 or the AP 106 to the SoftAP 200 or from the SoftAP 200 to any of the client devices 108a-108d may be referred to as a downlink (DL), and a communication link that facilitates transmission from any of the client devices 108a-108d to the SoftAP 200 or from the SoftAP 200 to the AP 104 or the AP 106 may be referred to as an uplink (UL). Alternatively, a downlink may be referred to as a forward link or a forward channel, and an uplink may be referred to as a reverse link or a reverse channel.

One or both of the AP 104 and the AP 106 may be configured as a base station and provide wireless communication coverage in a basic service area (BSA) associated with the respective AP. Depending on the technology considered, a basic service area can sometimes be called a coverage area, cell, etc. An access point along with the SoftAP 200 and the client devices 108a-108d may be referred to as a basic service set (BSS).

Figure 2:
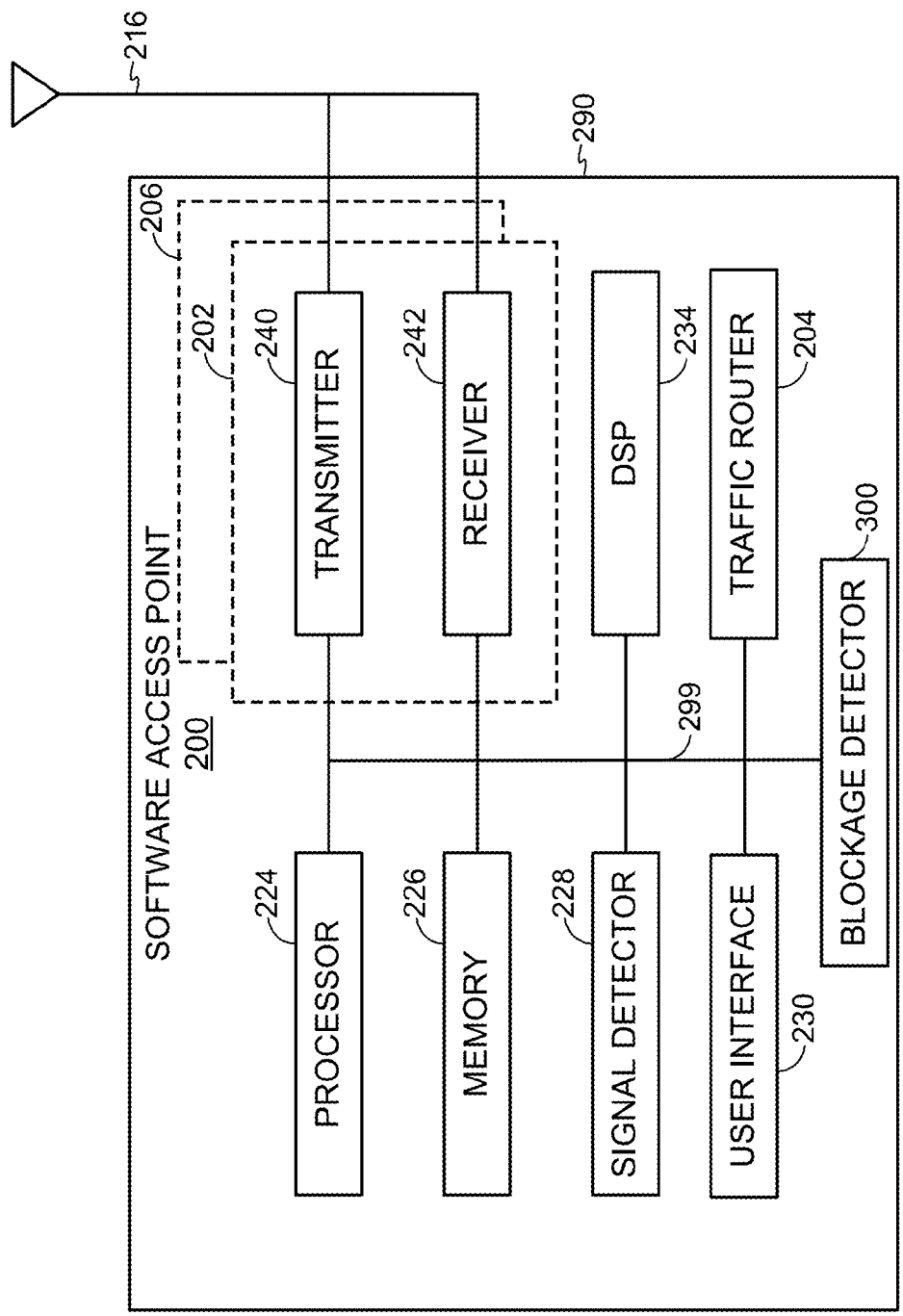
FIG. 2 illustrates an example of a functional block diagram of a SoftAP that may be employed within the wireless communication networks of FIG. 1.

FIG. 2 illustrates an example of a functional block diagram of a SoftAP that may be employed within the wireless communication networks of FIG. 1. The SoftAP 200 is an example of a device that may be configured to implement the various methods described herein. The SoftAP 200 may be implemented as a wireless communication device such as a multimode or multiband device capable of operating using different radio access technologies (RATs), such as using WiFi, LTE, LTE Advanced, HSPA, CDMA, HRPD, eHRPD, CDMA2000, GSM, GPRS, EDGE, UMTS, or the like.

The SoftAP 200 may include a mobile access point processor 224 which controls operation of the SoftAP 200. The mobile access point processor 224 may also be referred to as a central processing unit (CPU) or hardware processor. The mobile access point processor 224 is configured to control operation in the context of a mobile access point which includes efficient resource utilization to maximize performance and battery life. A memory 226, which may include both read-only memory (ROM) and random access memory (RAM), provides instructions and data to the mobile access point processor 224. A portion of the memory 226 may also include non-volatile random access memory (NVRAM). The mobile access point processor 224 may perform logical and arithmetic operations based on program instructions stored within the memory 226. The instructions in the memory 226 may be executable to implement the methods described herein.

The data in memory 226 may include configuration data. Configuration data may be preloaded into the memory 226. Configuration data may be obtained from a user of the SoftAP 200 (e.g., through a user interface 230, subscriber identity module (SIM) card, download, over the air). The mobile access point processor 224 may perform logical and arithmetic operations further based on the configuration data.

In some aspects, the mobile access point processor 224 is configured to cause signals to be sent to and to be received from another device (e.g., the AP 104, the AP 106, the client devices 108a-108d, etc.). The mobile access point processor 224 may be further configured to enforce access permissions.

The mobile access point processor 224 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory computer-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions or code, when executed by the one or more processors, cause the processing system to perform the various functions described herein.

The SoftAP 200 may also include a housing 290 that includes the client interfaces 202 (e.g., cellular client interface 202b and Wi-Fi client interface 202a) and the serving Wi-Fi network interface 206. Each of the client interface 202 and the serving Wi-Fi network interface 206 may include a transmitter 240 and/or a receiver 242 to allow transmission and reception of data between the SoftAP 200 and one or more target remote locations. The transmitter 240 and receiver 242 may be combined into a transceiver. It will be appreciated that the transmitter 240 and/or receiver 242 may be multiplexed to allow the same transmitter 240 and/or receiver 242 to be used for multiple interfaces (e.g., client interface and serving interface). An antenna 216 may be attached to the housing 208 and electrically coupled to one or more transceivers for wireless communications. The SoftAP 200 may also include (not shown) multiple transmitters, multiple receivers, multiple transceivers, and/or multiple antennas.

The SoftAP 200 may also include a signal detector 228 that may be used in an effort to detect and quantify the level of signals received by the transceiver. The signal detector 228 may detect such signals as total energy, energy per subcarrier per symbol, power spectral density, and other signals. The SoftAP 200 may also include a digital signal processor (DSP) 234 for use in processing signals. The DSP 234 may be configured to generate a packet for transmission and/or process a received packet.

In some aspects, the SoftAP 200 may further comprise a user interface 230. The user interface 230 may comprise a keypad, a microphone, a speaker, and/or a display. The user interface 230 may include any element or component that conveys information to a user of the SoftAP 200 and/or receives input from the user.

The various components of the SoftAP 200 may be coupled together by a bus system 299. The bus system 299 may include a data bus, for example, as well as a power bus, a control signal bus, and a status signal bus in addition to the data bus. Those of skill in the art will appreciate the components of the SoftAP 200 may be coupled together or accept or provide inputs to each other using some other mechanism.

Although a number of separate components are illustrated in FIG. 2, those of skill in the art will recognize that one or more of the components may be combined or commonly implemented. For example, the mobile access point processor 224 may be used to implement not only the functionality described above with respect to the mobile access point processor 224, but also to implement the functionality described above with respect to the signal detector 228 and/or the DSP 234. Further, each of the components illustrated in FIG. 2 may be implemented using a plurality of separate elements. For example, the mobile access point processor 224 and the memory 226 may be embodied on a single chip. The mobile access point processor 224 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the terms "circuit" and "circuitry" are construed as a structural terms and not as functional terms. For example, circuitry can be an aggregate of circuit components, such as a multiplicity of integrated circuit components, in the form of processing and/or memory cells, units, blocks, and the like, such as shown and described in FIG. 2. One or more of the functional blocks and/or one or more combinations of the functional blocks described with respect to the SoftAP 200 may also be implemented as a combination of computing devices, e.g., a combination of a DSP and a microprocessor, a plurality of microprocessors, one or more microprocessor in conjunction with a DSP communication, or any other such configuration.

In some other implementations, a command line interface and/or graphical user interface (GUI) may be provided at or by the SoftAP 200 via at least the user interface 230 and may allow for receipt of data to setup or configure routing parameters and/or blockage detection for the SoftAP 200. In other implementations, the command line interface or GUI may be presented via one or more of the client devices 108a-108d or and the input values may be passed to the SoftAP 200 for storage and utilization in routing. For example, the user interface 230 may provide configuration for identified troubled (e.g., blocked) connections. In such interfaces, the network blocking the connection may be identified along with a listing of alternate networks which may be used for connecting to the desired service. Policy based routes may be installed for the traffic router 204 causing the traffic router 204 to route the specified connections over the specified connection rather than the troubled connection.

As discussed with reference to FIG. 1, the SoftAP 200 may include a traffic router 204. The traffic router 204 may be configured to identify which client interface to utilize for client device communications. The traffic router 204 may utilize configuration information stored in the memory 226 to identify the client interface. For example, the traffic router 204 may utilize information included in a packet of data such as the destination address or destination port to identify communication channels which may be blocked by, for example, the Wi-Fi AP 106.

In one implementation, the traffic router 204 may utilize a routing table. The routing table includes one or more entries identifying how information received from a source should be transmitted to a destination. The traffic router 204 may be implemented using a packet filter framework such as nftables 0.4 made publicly available by the Netfilter Core Team under the terms of GNU GPLv2.

In one implementation, the packet filter framework may include a kernel engine that adds a simple virtual machine into the operating system kernel. The kernel engine may be configured to execute bytecode to inspect a network packet and make decisions on how that packet should be handled. This virtual machine intentionally may be configured to obtain data from the packet itself, inspect the associated metadata (e.g., inbound interface), and manage connection tracking data. Arithmetic, bitwise and comparison operators can be used for making decisions based on that data. The packet filter framework virtual machine may also capable of manipulating sets of data (e.g., IP addresses), allowing multiple comparison operations to be replaced with a single set lookup. The packet filter framework may also offer a programming interface that allows atomic replacements of one or more firewall rules within a transaction. This allows efficient configuration of firewall changes as a packet filter may be updated dynamically, such as based on the detection of a blockage as described herein.

A packet filter may include information identifying packets sent by or to a specific device such that a packet including such information can be specifically processed (e.g., filtered). The traffic router 204 may include a packet selection system configured for packet filtering, network address translation, or packet mangling (e.g., altering a value included in the packet such as source address).

As routing decisions are made by the traffic router 204, the information may be stored in the memory 226. In such implementations, a cache of routing decisions may be maintained for a given period of time. The decisions may be cached per device, per destination address, per destination port, or some combination thereof.

The SoftAP 200 shown in FIG. 2 includes the blockage detector 300. The blockage detector 300 is configured to determine whether a failed packet transmission was due to blocking by an AP or some other reason (e.g., network error, service availability, etc.). The blockage detector 300 is described in further detail above and below.

Figure 3:
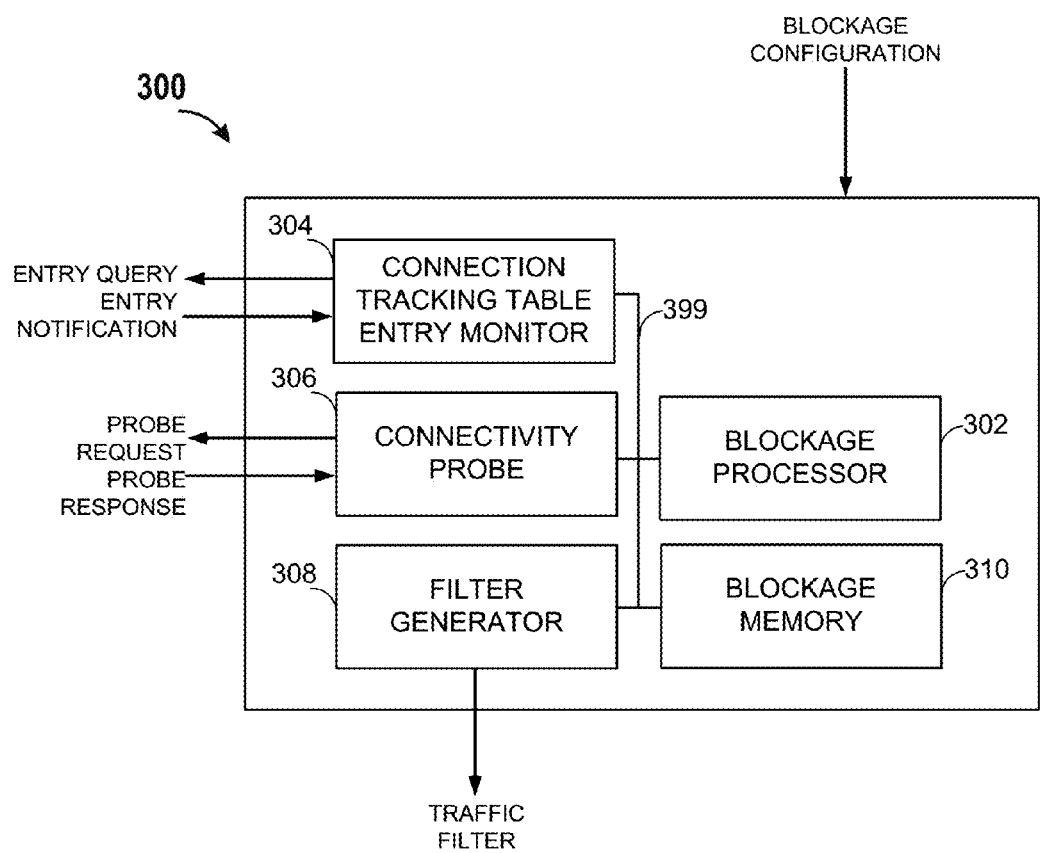
FIG. 3 illustrates a functional block diagram of an exemplary blockage detector.

FIG. 3 illustrates a functional block diagram of an exemplary blockage detector. The blockage detector 300 may be included in the devices or systems shown in FIG. 1 or 2.

In the network address translation implementations, different timeouts for connections (e.g., TCP/IP connections) may be assigned based on the state of the connection. In general, for the initial states (SYN Sent or SYN Received), the timeout may be in order of few seconds. Also the timeouts may be configurable on the fly. User datagram protocol (UDP) connections may also include configurable timeouts. The network access translation included in the SoftAP 200 may include a registration process to allow the blockage detector to register to receive indications when a network access translation table entry is deleted. A connection tracking table entry monitor 304 may be included in the blockage detector 300. A connection tracking table may be used to store connection state information for a connection. The connection state information included in an entry for a given connection may include connection protocol (e.g., TCP, UDP, etc.), connection identifier code, connection state (e.g., established, synchronization sent (syn_sent), synchronization received (syn_recv), etc.), source address, destination address, source port, destination port, quantity of data transmitted via the connection, protocol specific attributes (e.g., assured delivery), and/or other information about the connection. The connection tracking table entry monitor 304 may transmit an entry query to register to receive the indications about a given entry. The connection tracking table entry monitor 304 may be configured to transmit the entry query to register for notifications upon the receipt of a first packet from a client device to a destination address. The entry query may include a source address, destination address, or other information suitable to identify an entry in the translation table maintained by the SoftAP 200. In response, the connection tracking table entry monitor 304 may receive entry notification messages which may include indications that a given entry has been deleted. In some implementations, the connection tracking table entry monitor 304 may be configured to query the connection tracking table periodically. In such implementations, the connection tracking table entry monitor 304 may not register for notifications of specific entry updates, but rather maintain a snapshot of the connection tracking table which may be periodically updated. The updates may be performed by receiving entry notifications or by comparing a current connection tracking table query result with a previously stored result. Other methods of identifying connection tracking table entries which have expired may be implemented without departing from the scope of the disclosure.

The registrations may be stored in a blockage memory 310. In such implementations, as the connection tracking table entry monitor 304 receives notifications for expiration of an entry, the entry identified by the notification may be compared to the registrations stored in the blockage memory 310. The entry may be marked as being deleted. The deletion information may be used by the blockage detector 300 to determine whether the deletion was caused by network failure or blockage.

In one implementation, the connection tracking table entry monitor 304 may be configured to access an interface to obtain a list of active flows, IPv4 network access translated flows, and monitor connection tracking events for flows. One example interface accessed by the connection tracking tale entry monitor 304 may be provided by a system configured to execute conntrack-tools which is a set of free software tools for GNU/Linux that allow system administrators interact, from user-space, with the in-kernel Connection Tracking System, which is the module that enables stateful packet inspection for routing tables (e.g., iptables or nftables). The connection tracking table entry monitor 304 may be configured to use additional or alternative features to identify and track communication flows. Other examples include port monitoring, requesting a report of current connection information, stateful or stateless connection tracking devices and/or methods, stateful or stateless packet inspection devices and/or methods, or the like.

To detect a blockage, consider as one example a transmission control protocol (TCP) connection failure. If the initial TCP connection from a client device fails, the connection tracking table entry corresponding to that connection expires after the TCP idle timeout. In such instances, a client may send a TCP SYN packet to the service on the wide-area network. If the TCP SYN packet is dropped somewhere after leaving the SoftAP 200 via the Wi-Fi network client interface 202a, the client device may be configured to retry transmission for a maximum number of retries and closes the connection. When the TCP SYN packet is sent from the SoftAP 200, the SoftAP 200 may be configured to create a connection tracking table entry. After the connection is closed by the client device after the maximum number of retries, the corresponding connection tracking table entry will timeout after TCP idle timeout. This timeout may be detected by the connection tracking table entry monitor 304.

Once an indication of expiration is received, the blockage detector 300 may be configured to check the TCP state of that corresponding network address translation (NAT) entry. If the state is either of SYN_SENT or SYN_RECEIVED (e.g., SYN_RCVD) or another initialization state of TCP connection, the blockage detector 300 may be configured to check whether Wi-Fi network is accessible. SYN_SENT is an example indication of a synchronization sent state for the TCP connection. The synchronization sent state indicates a packet has been sent to the wide-area network service but no response has been received. SYN_RECEIVED is an example indication of a synchronization received state for the TCP connection. The synchronization received state indicates a packet has been received from the wide-area network service but the TCP connection has not been established.

A connectivity probe 306 may be included to perform backhaul probing techniques to determine whether there is a blockage which may be remedied by switching access interface, or if there is a different obstacle to communication. The connectivity probe may use connection parameters (e.g., address, protocol, security elements) to send ping requests to a well-known server and identify a response therefrom. A well-known server may be a preconfigured server at a known network address. The well-known server may be associated with having a high availability such that a failure to connect to the server can be inferred to be a network connectivity failure rather than a failure of the server. The connectivity probe may send UDP packets to the well-known server and identify a response therefrom. The connectivity probe may use TCP to connect to a well-known server and see if the connection is successful or not. These are just three ways in which the connectivity probe can assess the path from the SoftAP 200 to a given destination in the wide-area network 110.

The well-known server may be identified via the blockage configuration such as via an internet protocol (IP) address or a resolvable address (e.g., URL) identifying the server. In some implementations, the same well-known server may be used for probing multiple protocol connectivity. In such implementations, additional information may be included to indicate which protocols, ports, or other connection oriented characteristics may be tested via the associated server. Table 1 provides an example of how the blocking configuration may include probing information.

TABLE 1

| Server Address | Protocol(s) | Port(s) |
| --- | --- | --- |
| 198.203.208.123 | UDP | * |
| 332.235.2385.001 | TCP, UDP | 0-1000 |
| 203.857.937.735 | * | * |

As shown in Table 1, the probing information may include server addresses, protocols, and ports. The protocols and ports information may be specified as a single value (e.g., UDP for the first row), wildcard values (e.g., ports for the first row) which indicate that any valid value may be used, separated lists (e.g., protocols for the second row), or ranges (e.g., ports for the second row). Additionally, there may be multiple well-known servers which may be used to probe a specific connection type. For example, all three servers identified in Table 1 may be used to test UDP connectivity via port 21. As such, the servers may be organized in a prioritized list such that the servers appear in relative degree of preference. As shown in Table 1, the server listed nearer to the top of the list is preferred to a server listed further below. This provides a non-limiting advantage of fall back well-known servers which can be probed should another experience a failure or a cross-check to allow for multifactor failure checking by the blockage detector 300. For example, the blockage detector 300 may be configured to probe two well-known servers and compare the probe results to arrive at an assessment of the blockage.

Returning to the TCP example, if the backhaul probe is successful (e.g., the well-known server is accessible via TCP via the Wi-Fi AP 106), then it is understood that only the particular TCP connection (e.g., for the specified service) is blocked somewhere in the Wi-Fi network. For the subsequent packets related to this connection, all the packets may be routed to an alternate access point which may not be configured to block the traffic.

The blockage detector 300 may include a filter generator 308 to generate traffic filters upon detecting a blockage. The filter generator 308 may be configured to generate connection tracking table entries to indicate that traffic for a service should be routed via an alternate interface. For example, if it is determined that the Wi-Fi AP 106 is blocking a streaming video service, the filter generator 308 may generate a routing entry for packets transmitted to the streaming video service which channels the packets through the cellular client interface 202b of the SoftAP 200 rather than the Wi-Fi client interface 202a of the SoftAP 200. Accordingly, policy based routing (e.g., packet filters) may be used to route connections away from the blocked AP to an alternate AP which may permit such traffic. Because the rest of the packets for the service from the client device will not match these filters they will be routed to the alternate AP.

The filters may be maintained until the connection tracking table entry monitor 304 receives an indication that the connection for the session has expired. At such point, the filter may be removed by the blockage detector 300. In some implementations, the filter may expire automatically upon expiration of the connection tracking table entry.

The blockage detector 300 may include a blockage processor 302. The blockage processor 302 may be included to coordinate the blockage detection process. The coordination may include triggering monitoring activities of the connection tracking table entry monitor, connectivity probing, filter generation, and processing of blockage configuration information. The blockage processor 302 may be implemented as a circuit to perform the coordination functions described. In some implementations the blockage processor 302 may receive instructions which, when executed by the blockage processor 302, cause the blockage processor 302 to perform the functions described.

Although the example discussed above references blockage detection for TCP connections, a similar approach may be used to detect blockages for other connections. For example, connection tracking table entries may be maintained for UDP connections. The initial state of a UDP connection tracking table entry may be identified by the UNREPLIED state. The unreplied state indicates a packet has been sent to the wide-area network service but no response has been received. When packets are received in both directions, the state will be moved to ASSURED. In the UDP case, the connection tracking table entry monitor 304 may receive indications about UDP entry expiry, and once the indication is received, may be configured to check the UDP state of that corresponding entry. If the state of the entry is UNREPLIED (e.g., indicating an initial state of UDP connection), the connectivity probe 306 may be configured to check whether UDP is permitted via the Wi-Fi AP 106. The wireless local area network (WLAN) may be accessible for this check. If the backhaul probe is successful (e.g., the well-known server is accessible via UDP via the Wi-Fi AP 106), then it is understood that only this particular UDP connection is blocked. As with TCP blockage, the filter generator 308 may generate a traffic filter to route any subsequently received traffic for this service to an alternate AP.

While the above examples describe detecting Wi-Fi AP blockages, similar techniques may be applied to detect other blockages which may exist for other APs. For example, a blockage on the cellular network AP may be detected for a given service and subsequent routing may be performed to a Wi-Fi AP.

Figure 4:
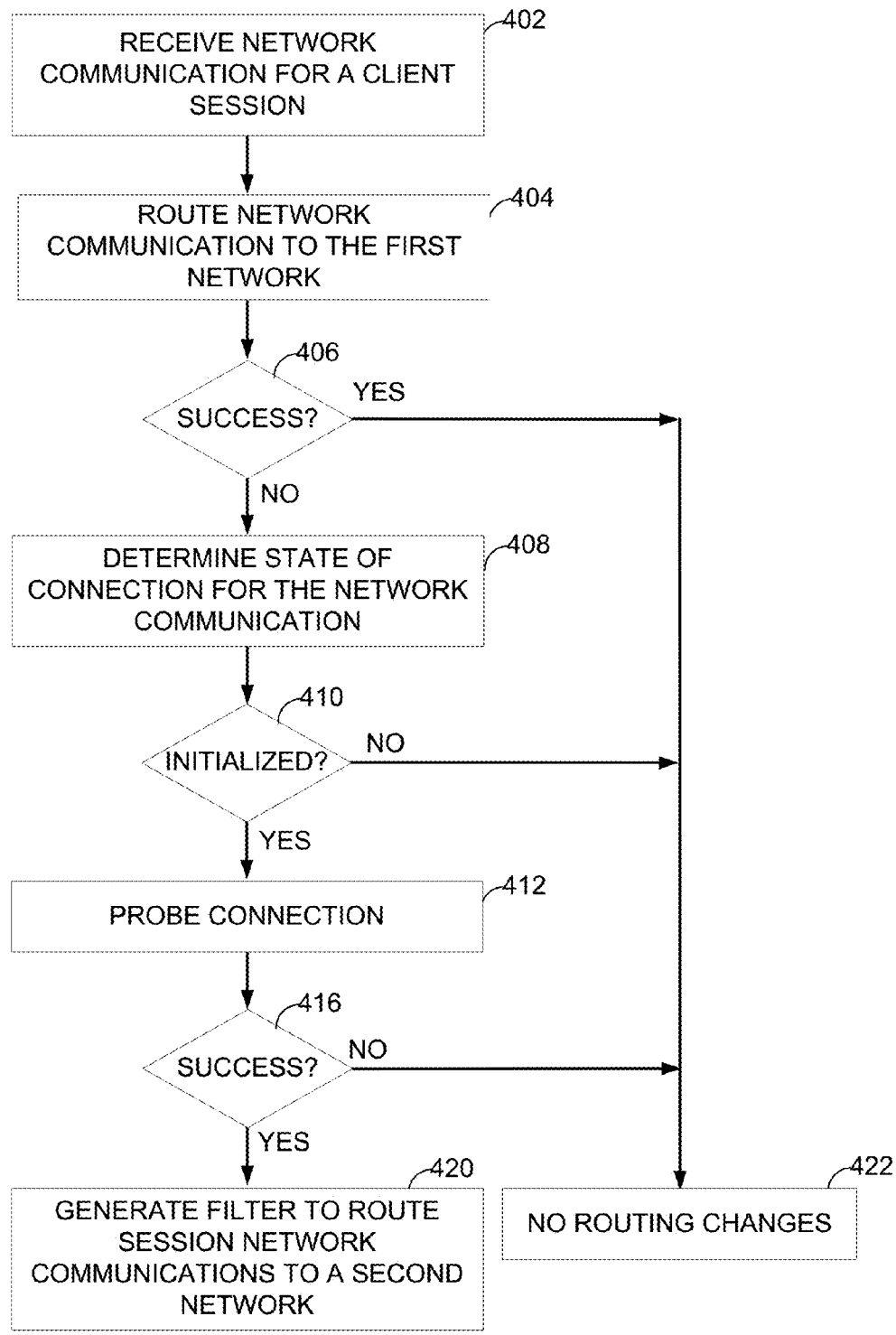
FIG. 4 illustrates a process diagram of an exemplary method for connection switching.

FIG. 4 illustrates a process diagram of an exemplary method for connection switching. In one implementation, one or more of the steps in the process 400 may be performed by, or in connection with, the SoftAP 200 shown in FIGS. 1 and 2, or the blockage detector 300 of FIG. 3, although those having ordinary skill in the art will appreciate that other components may be used to implement one or more of the steps described herein. Although blocks may be described as occurring in a certain order, the blocks can be reordered, omitted, and/or additional blocks added.

At block 402, a network communication for a client session is received by the SoftAP 200 from a client device. The client session network communication includes a destination address of a service located on the wide-area network which the client device is attempting to access. The network communication may be for a specific protocol (e.g., UDP, TCP). The network communication may be for a specific port of the service. Other connection characteristics may be requested via the network communication such as buffer size, window size, port, packet size, or datagram size.

At block 404, the network communication is routed to a first network access point. The first network access point may be the access point providing the highest signal strength to the SoftAP 200.

At block 406, a determination is made as to whether the communication was successfully transmitted to the service. The success of the communication may be determined based on receipt of an acknowledgment message from the service. If the SoftAP 200 receives such acknowledgment, the connection may be deemed to be successful and no blockage was encountered. As such, at block 422 no routing changes are applied.

Returning to block 406, if the determination is made that the communication was not successfully transmitted to the service, the process continues to block 408. At block 408, the state of the connection for the network communication via the first network is determined. The state information may be determined by looking at the connection tracking table entry for the client session.

At block 410 a determination is made as to whether the state for the connection via the first network has been initialized. If the connection state indicates no initialization, then the access point was not the cause of failure for the connection. That is, the connection has passed the initialization state and some other trouble caused the failure such as a failure at the destination server. In such instances, the process continues to block 422 as described above without changing the routing.

Returning to block 410, if the connection is still in the initialize state, the blockage may be present. That is, the SoftAP 200 has not completed initialization of the connection via the first network.

At block 412, connection probing is performed. Connection probing may include attempting to connect to a well-known server using similar connection characteristics as used for the client session. For example, the probing may include attempting to establish a UDP connection to a well-known server. As discussed above, the probing may include probing more than one well-known server to obtain multiple data points for probe success determination.

At block 416, a determination is made as to whether the probe was successful. The success of a probe is determined by identifying receipt of an acknowledgment from the well-known server that the requested connection was established. In cases where multiple probes are transmitted, the success may be determined using results from each probe or a majority of the probes (e.g., if 2 of 3 are successful, the determination is affirmative). If the determination at block 416 is negative, the connection for the well-known server as well as the client session both failed. Determining why both of these failures occurred may not confidently be attributed to route blocking by the first network. Indeed, there may be other issues preventing such connections. As such, the process 400 continues to block 422 where no routing changes are performed.

Returning to block 416, if the probe to the well-known server was successful, this indicates that the first network permits and is actively processing connections similar to those requested by the client session. Accordingly, it may be deduced that the first network is blocking the client session connection. In such instances, the process 400 at block 420 generates a filter to route the client session network communications to a second network which uses different AP than the first network.

Figure 5:
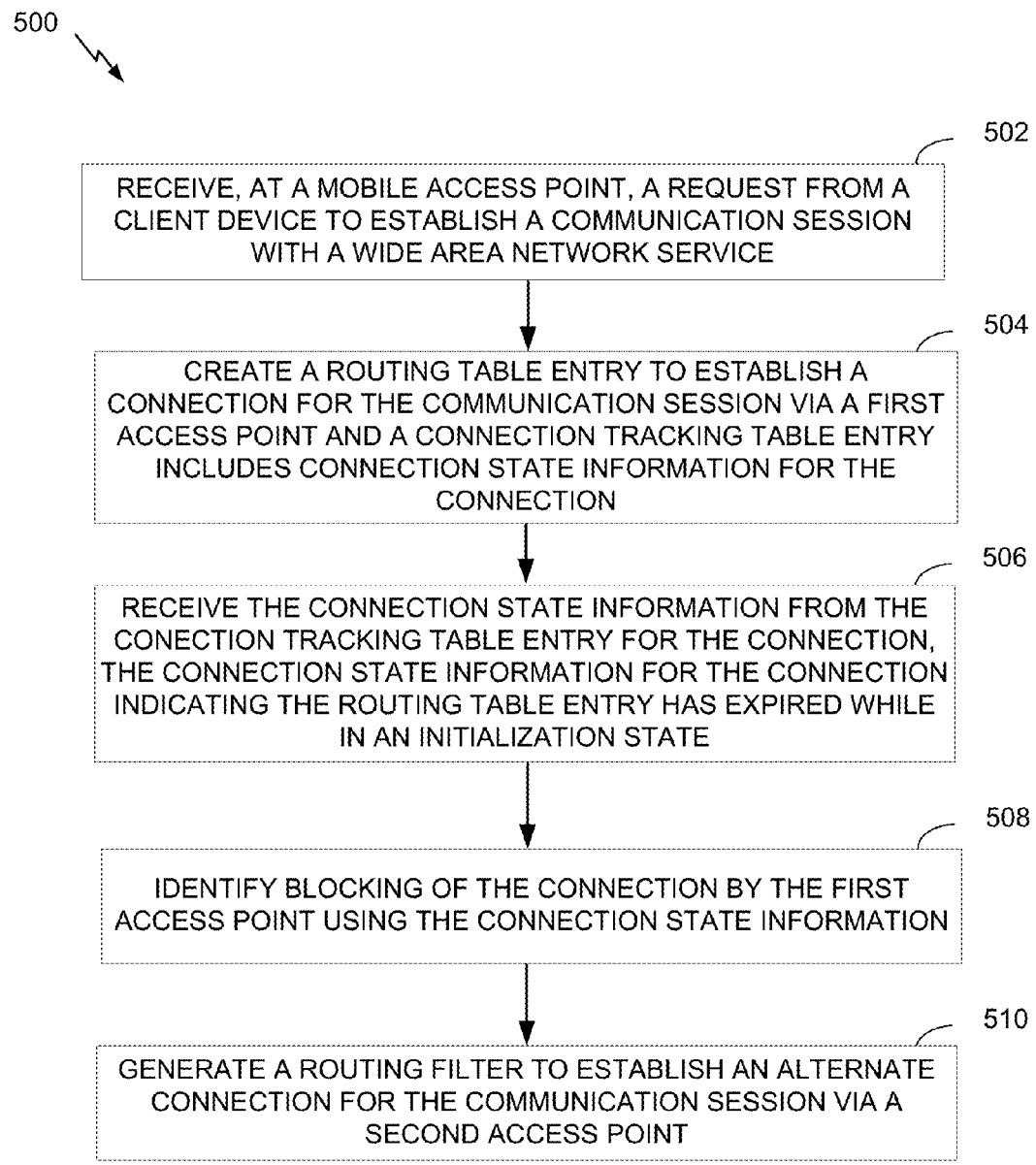
FIG. 5 illustrates a flow diagram of a method of network connection switching.

FIG. 5 illustrates a flow diagram of a method of network connection switching. The method 500 shown in FIG. 5 may be implemented in whole or in part by, or in connection with, the devices described herein such as the SoftAP 200 shown in FIGS. 1 and 2, or the blockage detector 300 of FIG. 3. Those having ordinary skill in the art will appreciate that other components may be used to implement one or more of the steps described herein. Although blocks may be described as occurring in a certain order, the blocks can be reordered, blocks can be omitted, and/or additional blocks can be added.

At block 502, a request from a client device to establish a communication session with a wide-area network service is received at a mobile access point. At block 504, a connection tracking table entry is created to establish a connection for the communication session via a first access point. The connection tracking table entry includes connection state information for the connection. At block 506, the connection state information is received from the connection tracking table entry for the connection. The connection state information for the connection indicates the connection tracking table entry has expired while in an initialization state. At block 508, blocking of the connection by the first access point is identified using the connection state information. At block 510, a routing filter is generated to establish an alternate connection for the communication session via a second access point.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A device for network connection switching comprising:
   an access point network interface configured to communicate messages to and from a client device;
   a first client network interface configured to communicate messages to and from a wide-area network via a first access point via a first radio access technology;
   a second client network interface configured to communicate messages to and from the wide-area network via a second access point via a second radio access technology;
   a traffic router configured to direct a message received from a client device for a service located on the wide-area network to one of the first client network interface or the second client network interface; and
   a blockage detector configured to:
      create a connection tracking table entry to establish a connection for communicating the message to the service, wherein the connection tracking table entry includes connection state information for the connection;
      receive the connection state information from the connection tracking table entry for the connection, the connection state information for the connection indicating the connection tracking table entry has expired while in an initialization state;
      identify blocking of the connection at the first access point or the second access point receiving the message using the connection state information for the connection used for the message; and
      adjust the traffic router to direct a subsequent message for the service from the client device to the other of the first client network interface or the second client network interface.

2. The device of claim 1, wherein the traffic router is configured to maintain a connection tracking table for communication sessions for the client device, wherein, for a communication session for the client device via the connection, the connection tracking table includes information identifying the client device, the service located on the wide-area network, and a network interface used for the connection.

3. The device of claim 2, wherein the connection tracking table includes state information for a network connection via the network interface.

4. The device of claim 1, wherein the connection is a user datagram protocol connection, and wherein the connection state information for the connection indicates a packet has been sent to the wide-area network service but no response has been received.

5. The device of claim 1, wherein the connection is a TCP connection, and wherein the connection state information for the connection indicates the connection as being in one of:
   a first state indicating that a packet has been sent to the wide-area network service but no response has been received; and
   a second state indicating that a packet has been received from the wide-area network service but the TCP connection has not been established.

6. The device of claim 1, wherein the blockage detector is further configured to probe a server at a preconfigured network location using connection parameters from the connection, and wherein blocking is identified when the probe indicates successful connection to the server.

7. The device of claim 1, wherein the blockage detector is configured to adjust the traffic router by generating a routing filter for messages sent by or to the client device.

8. The device of claim 7, wherein the blockage detector is configured to generate the routing filter by generating a packet filter including information identifying packets from the client device for the service.

9. The device of claim 1, wherein the wide-area network comprises the Internet.

10. The device of claim 1, wherein the first radio access technology is a cellular radio access technology, and wherein the second radio access technology is a non-cellular radio access technology.

11. A method of network connection switching, the method comprising:
receiving, at a mobile access point, a request from a client device to establish a communication session with a wide-area network service;
creating a connection tracking table entry to establish a connection for the communication session via a first access point, the connection tracking table entry includes connection state information for the connection;
receiving the connection state information from the connection tracking table entry for the connection, the connection state information for the connection indicating the connection tracking table entry has expired while in an initialization state;
identifying blocking of the connection by the first access point using the connection state information; and
establishing an alternate connection for the communication session via a second access point.

12. The method of claim 11, wherein the connection tracking table entry further includes information identifying the client device providing a message via the connection, the wide-area network service, and a network interface for communicating the message.

13. The method of claim 11, wherein blocking of the connection is identified when the connection state information for the connection indicates the connection tracking table entry has expired while in an initialization state.

14. The method of claim 13, wherein the connection is a user datagram protocol connection, and wherein the state information for the connection indicates a packet has been sent to the wide-area network service but no response has been received.

15. The method of claim 13, wherein the connection is a TCP connection, and wherein the state information for the connection indicates the connection as being in one of:
a first state indicating that a packet has been sent to the wide-area network service but no response has been received; and
a second state indicating that a packet has been received from the wide-area network service but the TCP connection has not been established.

16. The method of claim 11, further comprising probing a server at a preconfigured network location using connection parameters from the connection, wherein blocking is identified when the probing indicates successful connection to the server.

17. The method of claim 11, wherein establishing the alternate connection comprises generating a routing filter for messages sent between the client device and the wide-area network service.

18. The method of claim 17, wherein the routing filter comprises a packet filter including information identifying packets from the client device for the wide-area network service.

19. The method of claim 11, wherein the wide-area network comprises the Internet.

20. The method of claim 11, wherein:
the first access point is a non-cellular access point and the second access point is a cellular access point, or
the first access point is a cellular access point and the second access point is a non-cellular access point.

21. A non-transitory computer-readable medium comprising code that, when executed, causes an apparatus to:
receive a request from a client device to establish a communication session with a wide-area network service;
create a connection tracking table entry to establish a connection for the communication session via a first access point, the connection tracking table entry includes connection state information for the connection;
receive the connection state information from the connection tracking table entry for the connection, the connection state information for the connection indicating the connection tracking table entry has expired while in an initialization state;
identify blocking of the connection by the first access point using the connection state information; and
establish an alternate connection for the communication session via a second access point.

22. The non-transitory computer-readable medium of claim 21, wherein the code to create the connection tracking table entry causes the apparatus to include information identifying the client device providing a message via the connection, the wide-area network service, and a network interface for communicating the message in the connection tracking table entry.

23. The non-transitory computer-readable medium of claim 21, wherein the code causes the apparatus to identify blocking of the connection when the connection state information for the connection indicates the connection tracking table entry has expired while in an initialization state.

24. The non-transitory computer-readable medium of claim 23, wherein the code to identify blocking causes the apparatus to identify the connection as a user datagram protocol connection and the connection state information for the connection indicates a packet has been sent to the wide-area network service but no response has been received.

25. The non-transitory computer-readable medium of claim 23, wherein the code to identify blocking causes the apparatus to identify the connection as a TCP connection and the state information for the connection indicates the connection as being in one of:
a first state indicating that a packet has been sent to the wide-area network service but no response has been received; and
a second state indicating that a packet has been received from the wide-area network service but the TCP connection has not been established.

26. The non-transitory computer-readable medium of claim 21, further comprising code causing the apparatus to:
probe a server at a preconfigured network location using connection parameters from the connection; and
identify blocking when the probing indicates successful connection to the server.

27. The non-transitory computer-readable medium of claim 21, wherein establishing the alternate connection comprises generating a routing filter for messages sent between the client device and the wide-area network service.

28. The non-transitory computer-readable medium of claim 27, wherein the routing filter comprises a packet filter including information identifying packets from the client device for the wide-area network service.

29. A device for network connection switching comprising:
- means for receiving a request from a client device to establish a communication session with a wide-area network service;
- means for creating a connection tracking table entry to establish a connection for the communication session via a first access point, the connection tracking table entry includes connection state information for the connection;
- means for receiving the connection state information from the connection tracking table entry for the connection, the connection state information for the connection indicating the connection tracking table entry has expired while in an initialization state;
- means for identifying blocking of the connection by the first access point; and
- means for establishing an alternate connection for the communication session via a second access point.

\* \* \* \* \*